US010056951B2

(12) United States Patent
Cabrejas Penuelas et al.

(10) Patent No.: US 10,056,951 B2
(45) Date of Patent: Aug. 21, 2018

(54) METHOD FOR NON-COHERENT MULTI-USER MIMO DATA COMMUNICATION AND SYSTEM FOR PERFORMING SUCH METHOD

(71) Applicant: Bayerische Motoren Werke Aktiengesellschaft, Munich (DE)

(72) Inventors: Jorge Cabrejas Penuelas, Valencia (ES); Daniel Calabuig Soler, Valencia (ES); Sandra Roger Varea, Valencia (ES); David Gozalvez Serrano, Munich (DE); Peter Fertl, Munich (DE); Jose Francisco Monserrat Del Rio, Valencia (ES)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/493,793

(22) Filed: Apr. 21, 2017

(65) Prior Publication Data

US 2017/0230090 A1 Aug. 10, 2017

Related U.S. Application Data

(63) Continuation of application No. PCT/EP2014/072518, filed on Oct. 21, 2014.

(51) Int. Cl.
*H04B 7/0426* (2017.01)
*H04B 7/0452* (2017.01)
(Continued)

(52) U.S. Cl.
CPC ......... *H04B 7/0426* (2013.01); *H04B 7/0452* (2013.01); *H04B 17/336* (2015.01); *H04L 5/0055* (2013.01)

(58) Field of Classification Search
CPC .. H04B 7/0426; H04B 17/336; H04B 7/0452; H04L 5/0055
(Continued)

(56) References Cited

U.S. PATENT DOCUMENTS

| 8,526,520 B2* | 9/2013 | Turunen | H04L 27/0006 375/224 |
| 8,964,868 B2* | 2/2015 | Shin | H04W 52/146 375/267 |

(Continued)

OTHER PUBLICATIONS

Sandra Rogert et al., "Multi-user Non-Coherent Detection for Downlonk MIMO Communications", IEEE Signal Procesing Letters, vol. 21, No. 10, Oct. 1, 2014, pp. 1225-1229, XP011551840.*
(Continued)

*Primary Examiner* — Hai V Nguyen
(74) *Attorney, Agent, or Firm* — Crowell & Moring LLP

(57) ABSTRACT

A non-coherent multi-user MIMO communication method is disclosed. Firstly, a data transmission method includes the acts of a) estimating the signal-to-noise ratio for each receiver; b) selecting a power sharing factor for each receiver; c) encoding information to be sent to each receiver into a symbol for each receiver; and d) transmitting, by a transmitter, a signal that includes the power sharing factors and the symbols for all of the receivers. Furthermore, a reception method includes the acts of: i) receiving the power sharing factor; ii) decoding the signal corresponding to the highest power sharing factor; iii) determining if the signal decoded in step ii) corresponds to the current receiver; iv) if the decoded signal corresponds to the current receiver, finalize the reception; and v) if the decoded signal does not correspond to the current receiver, proceed with the following power sharing factors.

17 Claims, 4 Drawing Sheets

(51) Int. Cl.
*H04B 17/336* (2015.01)
*H04L 5/00* (2006.01)

(58) Field of Classification Search
USPC .......................................................... 455/522
See application file for complete search history.

(56) References Cited

U.S. PATENT DOCUMENTS

| | | | | |
|---|---|---|---|---|
| 9,619,246 B2* | 4/2017 | Lu | ............................. | G06F 9/442 |
| 9,820,159 B2* | 11/2017 | Ghasemzadeh | ....... | H04W 16/14 |
| 2010/0246705 A1* | 9/2010 | Shin | .................... | H04W 52/146 |
| | | | | 375/267 |
| 2011/0002410 A1* | 1/2011 | Forenza | ............... | H04B 7/0617 |
| | | | | 375/267 |
| 2012/0183030 A1* | 7/2012 | Turunen | ............. | H04L 27/0006 |
| | | | | 375/224 |
| 2015/0089105 A1* | 3/2015 | Lu | ........................... | G06F 9/442 |
| | | | | 710/269 |
| 2015/0282185 A1* | 10/2015 | Nikopour | .............. | H04L 1/0002 |
| | | | | 370/329 |
| 2016/0366003 A1* | 12/2016 | Kwon | .................. | H04L 1/0001 |
| 2017/0164187 A1* | 6/2017 | Lu | ........................... | H04W 8/24 |

OTHER PUBLICATIONS

VanKa S et al., "Superposition Coding Strategies: Design and and Experimental Evaluation", IEEE Transactions on wireless Communications, vo. 11, No. 7, Jul. 1, 2012, pp. 2628-2639, XP011453104.*
International Search Report (PCT/ISA/210) issued in PCT Application No. PCT/EP2014/072518 dated Jun. 19, 2015 (3 pages).
English-language Written Opinion (PCT/ISA/237) issued in PCT Application No. PCT/EP2014/072518 dated Jun. 19, 2015 (6 pages).

* cited by examiner

METHOD FOR NON-COHERENT MULTI-USER MIMO DATA COMMUNICATION AND SYSTEM FOR PERFORMING SUCH METHOD

CROSS REFERENCE TO RELATED APPLICATIONS

This application is a continuation of PCT International Application No. PCT/EP2014/072518, filed Oct. 21, 2014, the entire disclosure of which is herein expressly incorporated by reference.

BACKGROUND AND SUMMARY OF THE INVENTION

The present invention relates to wireless communications. In particular, it refers to non-coherent multi-user (MU), multiple-input multiple-output (MIMO) communications especially applicable in high mobility scenarios.

Prior art wireless communications techniques, such as Long Term Evolution (LTE) or IEEE 802.11p systems, are based on the concept of coherent communications in which the received signal is demodulated with the help of pilot signals. Pilot signals are reference signals that are known at both sides of the communication system (i.e. at the transmitter and receiver) to allow estimating the coefficients of the propagation channel. To this end, the pilot signals are either transmitted through a dedicated channel or they are embedded within the information data stream, thus consuming resources that would be otherwise dedicated to information data.

There exist, however, many techniques for non-coherent communication, where the transmitted signals have a particular structure that allows detecting data without knowing the channel coefficients at the receiver side. This means that pilot transmission and channel estimation are no longer necessary. A proper design of the transmitted signals can reach the capacity of non-coherent systems. In this sense, many constellation designs and their detection techniques can be found in prior art, most of them based on unitary space-time matrices. Examples of such techniques can be found, amongst others, in the articles: T. L. Marzetta and B. M. Hochwald, "Capacity of a mobile multipleantenna communication link in Rayleigh flat fading," IEEE Trans. Inf. Theory, vol. 45, no. 1, pp. 139-157, January 1999; B. M. Hochwald and T. L. Marzetta, "Unitary space-time modulation for multiple-antenna communication in Rayleigh flat-fading," IEEE Trans. Inf. Theory, vol. 46, no. 2, pp. 543-564, March 2000; M. Beko, J. Xavier, and V. Barroso, "Non-coherent communication in multipleantenna systems: Receiver design and codebook construction," IEEE Trans. Signal Process, vol. 55, no. 12, pp. 5703-5715, December 2007; I. Kammoun, A. Cipriano, and J. Belfiore, "Non-coherent codes over the Grassmannian," IEEE Trans. Wireless Commun., vol. 6, no. 10, pp. 3657-3667, October 2007; and Non-Coherent Space-Time Trellis-Coded Modulations for Network-Coded Wireless Relay Communications, US20120183020 A1.

Single-user (SU) multiple-input multiple-output (MIMO) transmission schemes exploit multiple transmit and receive antennas to improve the capacity, reliability and resistance to interferences of wireless communications. In this kind of systems, the communication from the transmitter to each user to be served takes place in orthogonal resources (time, frequency, etc.) that are assigned to each user in a previous phase.

Multi-user (MU) MIMO systems are those where the transmitter sends multiple information streams to multiple users overlapping in the same resource.

In current cellular systems, MU-MIMO communication has been shown to generally improve the overall system performance due to its increased sum data rate (aggregated data rate of all the users) with respect to its SU-MIMO counterpart. Previously proposed non-coherent detection techniques, however, 25 are intended for SU-MIMO communication and their extension to allow MUMIMO operation using non-orthogonal resources is not straightforward and has not been yet addressed. Motivated by the increased data rate of MU-MIMO communications, the current invention enables a MU-MIMO operation in a noncoherent framework.

Even though MU-MIMO communications have the potential to improve the performance of wireless communication systems by providing better data rates, prior art techniques have the problem that its application to vehicular communications, whether it is vehicle-to-vehicle (V2V), vehicle-to-device (V2D) or vehicle-to-infrastructure (V2I), is limited by the high mobility that characterizes this type of scenarios. In particular, channel estimation errors degrade significantly the performance of MU-MIMO systems based on coherent techniques, being especially critical as the number of transmission points and/or antennas increases. High mobility scenarios, such as vehicular communications, suffer frequently from channel estimation errors due to the high variability of the propagation channel. As a result, coherent reception in this type of scenarios generally requires the transmission of a higher number of pilots in order to accurately estimate the propagation channel and limit the negative effects of these errors. This reduces the amount of resources that are available for the transmission of data, and therefore, limits the data rate that can be achieved.

Another drawback of pilot-assisted coherent communications is the pilot pollution problem in dense deployment scenarios. When several transmitters are located close to each other, such as in the case of V2V communications, the pilot signals from different transmitters may interfere with each other. This interference may be severe due to the close proximity between transmitters, thus degrading the performance of the system.

The present invention solves the problems of prior art technique given that no pilot is used (preventing pilot pollution) and, furthermore, no estimation of channel is needed thereby improving the overall performance of the system. In particular, the present invention discloses a method for non-coherent multi user MIMO data transmission that comprises the steps of:

a) estimating the signal-to-noise ratio for each receiver;
b) selecting a power sharing factor for each receiver;
c) encoding information to be sent to each receiver into a symbol for each receiver; and
d) transmitting, by a transmitter, a signal that comprises, at least, the power sharing factors and the symbols for all of the receivers.

In a preferred embodiment, the signal transmitted on step d) is a sum of an arithmetical operation between the symbol and the power sharing factor of all of the receivers. Particularly, the signal transmitted on step d) is:

$$\sqrt{\gamma_1}x_1 + \sqrt{\gamma_2}x_2 + \ldots + \sqrt{\gamma_k}x_k$$

wherein $\gamma$ is the power sharing factor, x is the symbol and the sub-indexes 1, 2, ... k correspond to the receivers. Such indexes can be, for example, indexes assigned to the receivers wherein the lowest index corresponds to the receiver with the highest power sharing factor, then, the receivers are ordered by their power sharing factor until, the last receiver (k) corresponds to the receiver with the lowest power sharing factor.

Preferably, the estimation of the signal-to-noise ratio is done at each of the receivers and communicated to the transmitter through a control channel. However, in particular embodiments of the present invention, the estimation of the signal-to-noise ratio is done at the transmitter, e.g., by using a previous signal, i.e., a signal corresponding to a previous communication emitted by the receiver. Such previous signal may be an acknowledgment signal from a previous communication.

In yet another embodiment, the present invention contemplates that the estimation of the signal-to-noise ratio may be performed at the receiver. This estimation may be done by using a previous signal, such as a previous communication emitted by the transmitter or, more preferably, by using an acknowledgment or broadcast signal.

In addition, in step b) the power sharing factors are selected so that the sum of the power sharing factors for all of the receivers does not exceed 1. In a particular embodiment, before performing step d) the transmitter may send to each receiver its corresponding power sharing factor. On the other hand, the present invention discloses a non-coherent multi-user MIMO data reception that comprises the steps of:

i) receiving, from a transmitter the power sharing factor for all receivers;

ii) decode the signal corresponding to the highest power sharing factor;

iii) determining if the signal decoded in step ii) corresponds to the current receiver;

iv) if the decoded signal corresponds to the current receiver, finalize the reception;

v) if the decoded signal does not correspond to the current receiver, proceed with the next power sharing factor and repeat steps iii) to iv).

The present invention also envisages that, in step ii), the signal is decoded, for example, by using a maximum likelihood method.

Preferably, in step i) a consecutive index is determined for each receiver wherein the smallest index corresponds to the highest power sharing factor. Also, the indexes may be organized consecutively by the power sharing factors, 30 so that the highest index corresponds to the receiver with the lowest power sharing factor.

More preferably, in step v) the next power sharing factor corresponds to the next index.

Furthermore, the present invention discloses a system comprising at least a receiver and/or at least a transmitter that executes the above-disclosed methods.

BRIEF DESCRIPTION OF THE DRAWINGS

To complement the description being made and in order to aid towards a better understanding of the characteristics of the invention, in accordance with a preferred example of practical embodiment thereof, a set of drawings is attached as an integral part of said description wherein, with illustrative and non-limiting character, the following has been represented.

DETAILED DESCRIPTION OF THE DRAWINGS

Figure 1:
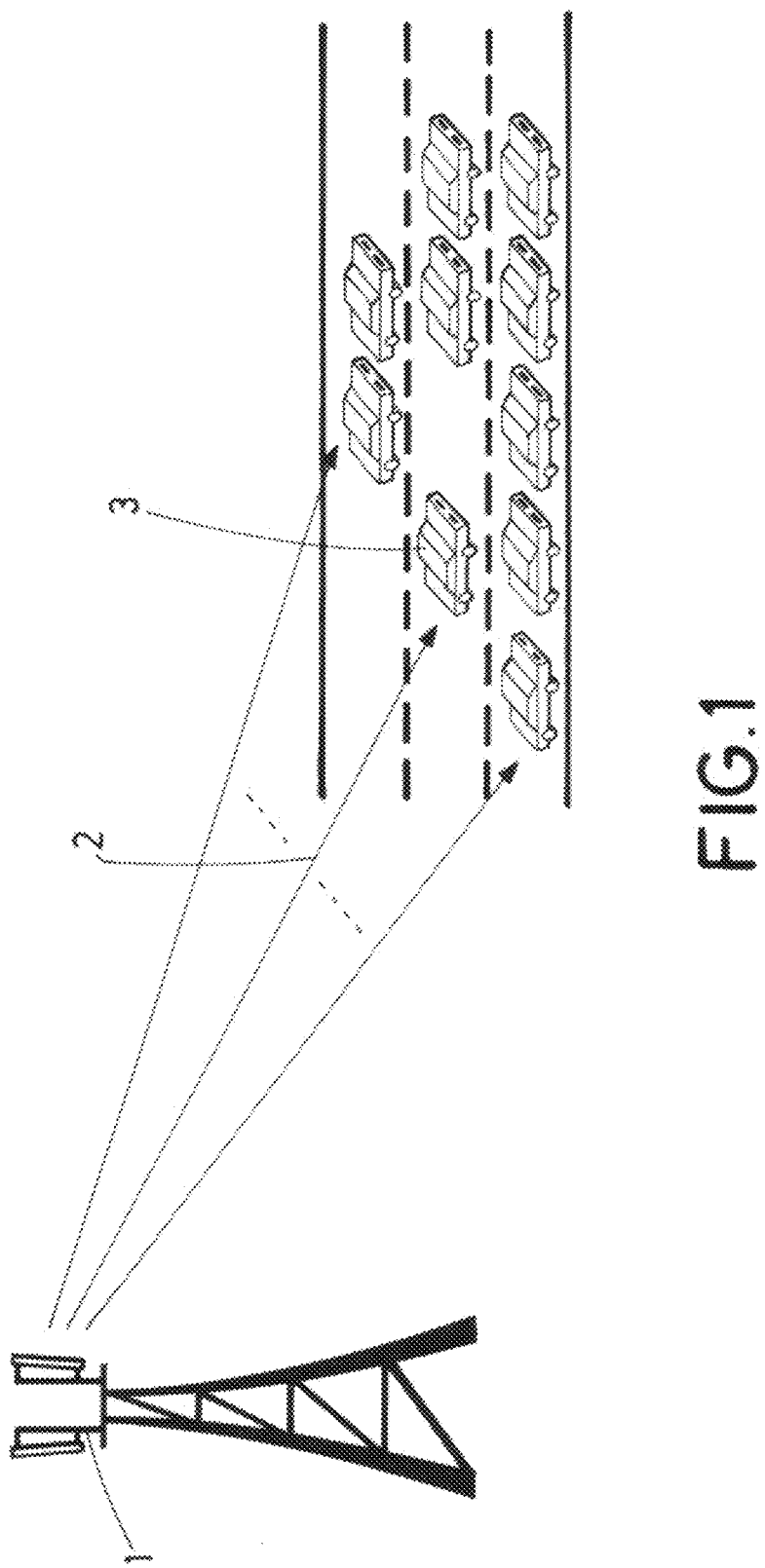
FIG. 1 shows a first embodiment of non-coherent MIMO transmission from a cellular base station to multiple vehicular users according to the present invention.

FIG. 1 shows a first embodiment in which a fixed transmitter (1) is configured to send signals (2) to users (3). These signals are sent using non-coherent MIMO transmission in order to improve the communications between the user (3) and the transmitter (1).

In this particular scenario, multiple vehicular users (3) are moving at a certain speed in an urban street or motorway. The users (3) receive a multiple-stream (MIMO) data connection, by the signal (2), from a transmitter (1) located over a cellular base station without being assigned orthogonal resources. The proposed innovation makes the communication with the vehicular users more robust to channel variations and it also saves those resources that would be allocated to pilot transmission in a coherent system.

In this exemplary embodiment, the transmitter (1) estimates the signal to noise ratio (SNR) at each receiver, i.e., for each user (3) by using the transmissions on the other direction of the communication (from the user (3) to the transmitter (1)) for the estimation.

There are multiple methods to estimate the SNR at the receiver side of a wireless communication system. A thorough comparison among some of them can be found in D. R. Pauluzzi and N. C. Beaulieu, "A Comparison of SNR 20 Estimation Techniques for the AWGN Channel", IEEE Transactions on Communications, Vol. 48, no. 10, October 2000. The data used for SNR estimation might be either already known by the user (3) (for example, training sequences provided for channel estimation in coherent systems) or unknown to the user (3). Estimates that obtain the SNR value from the unknown information-bearing portion of the received signal are known as "in-service" SNR estimators. These estimators are of particular interest since they do not penalize the throughput of the channel and can be used in conjunction with noncoherent data detection.

One of the best-performance in-service SNR estimates is the Maximum-Likelihood (ML) estimator. This method is very suitable for the present invention, since it does not require any previous transmission of training signals.

In short, this SNR estimator considers a sequence of samples of the received signal and a likelihood function based on the probability density function of the received signal. Then, it computes the values of the desired signal power and noise power that minimize the likelihood function. The quotient between these power values directly gives the SNR estimate.

Coherent systems also require a similar SNR estimation stage, since the channel coefficients estimation makes use of the SNR value. Therefore, SNR estimation and channel coefficients calculations are both necessary steps in a coherent system. On the other hand, the proposed multi-user non-coherent communication technique only requires the SNR estimation stage, which clearly reduces the computational cost of the coherent counter scheme.

Once the SNR estimation is performed, the transmitter (1) decides how to split its available power into the signals devoted to each receiver, that is, it selects a power sharing factor for each receiver. The sum of these power sharing factors cannot exceed one.

Then, the transmitter reports its decision to the receivers through a control channel. In particular, the transmitter sends, through a control channel, the corresponding power sharing factor for each of the receivers.

Finally, the transmitter (3) performs a transmission by superposition coding, that is, it encodes the information to be sent to users into symbols, one for each receiver. Subsequently, it weights the symbols by the corresponding power sharing factors, and it transmits the sum of the weighted symbols. This sum of the weighted symbols corresponds to the signal (2) that is transmitted to the users (3).

Now, it is necessary that the users (3) decode the signal (2). To accomplish this purpose, each of the receivers proceed to sort the receivers in decreasing order of their power sharing factors, so that the first receiver is the receiver with the greatest power sharing factor and the last receiver is the receiver with the lowest power sharing factor.

Starting with the first user, the signal (2) is decoded for the current user using, for instance, a maximum likelihood method assuming that the signals of the previous users are already decoded, and, then, continues with the following user until the receiver decodes its own signal.

In the particular case of the first user equipment (the user with the highest power sharing factor), it assumes that it is the only receiver in the system, therefore, it decodes its own signal and then finishes the decoding process.

Figure 2:
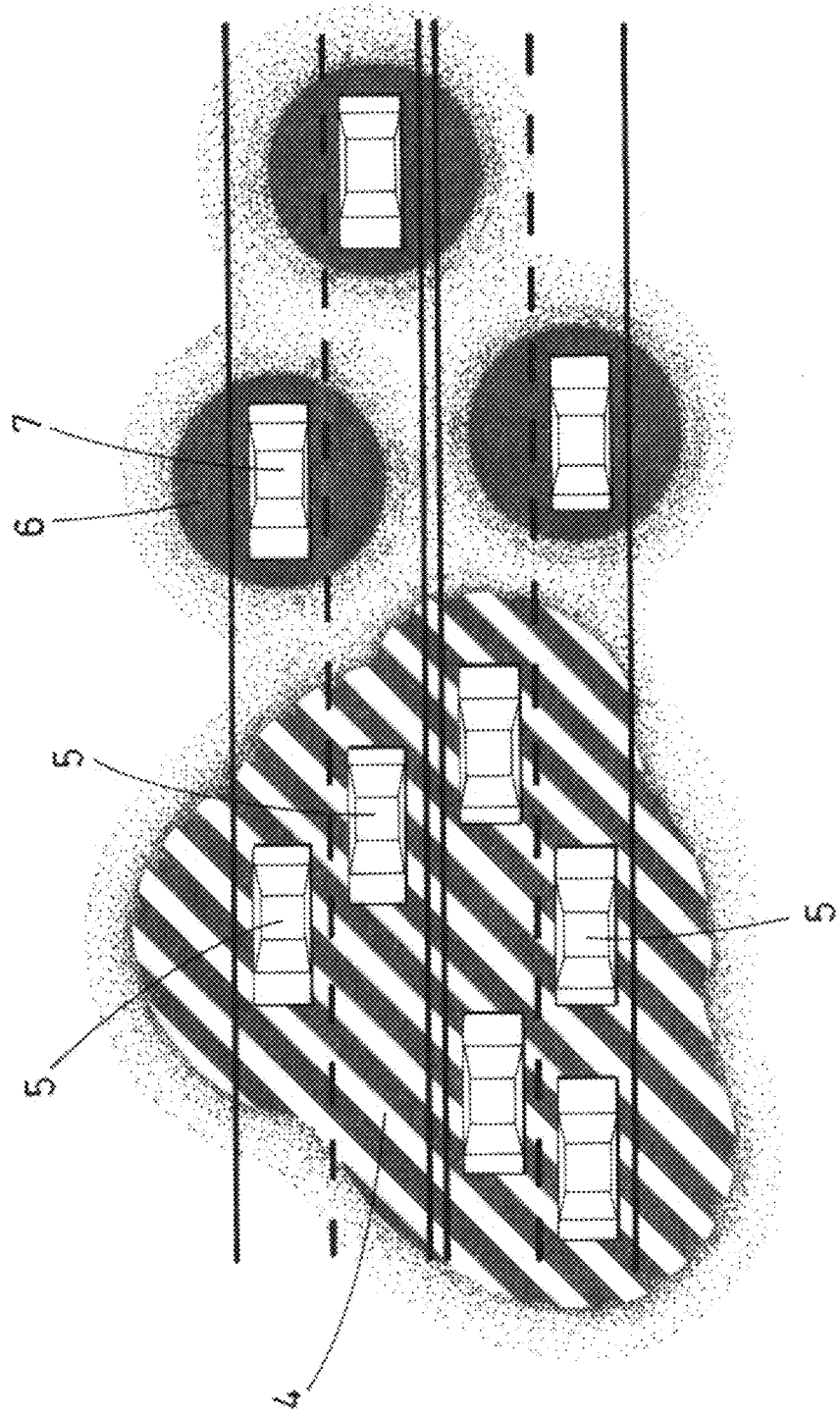
FIG. 2 shows a second embodiment of non-coherent MIMO transmission between multiple vehicular users (V2V) according to the present invention.

FIG. 2 shows a second embodiment wherein multiple vehicles (5, 7) are moving at a certain speed in an urban street or motorway. Assuming a conventional coherent communication between multiple vehicles, the signals from multiple vehicles overlap and their pilot signals for channel estimation interfere with each other.

In FIG. 2 it can be clearly seen that, in conventional communications, each vehicle (5, 7) transmits a pilot signal causing that vehicles can find themselves in two different situations. A first situation wherein the transmitting range (6) of the pilot signal of a first vehicle (7) does not encounter any pollution and a second situation wherein a second group of vehicles (5) find themselves in a polluted area (4). In fact, this pollution problem worsens as the number of transmitting vehicles increases, which could be the case of being in a traffic jam or in a road with multiple lanes at a rush hour. In these scenarios, the proposed non-coherent MU-MIMO transmission avoids the pilot pollution problem and, at the same time, allows for the spatial multiplexing of several data flows transmitted to different users or vehicles.

In this case, each vehicle acts as transmitter and receiver and, therefore, the estimation of a SNR is better to be performed at the receivers, which have to report the estimated SNR to the transmitter using a control channel. The rest of the communication process can be performed exactly as in the case of the embodiment of FIG. 1.

Figure 3:
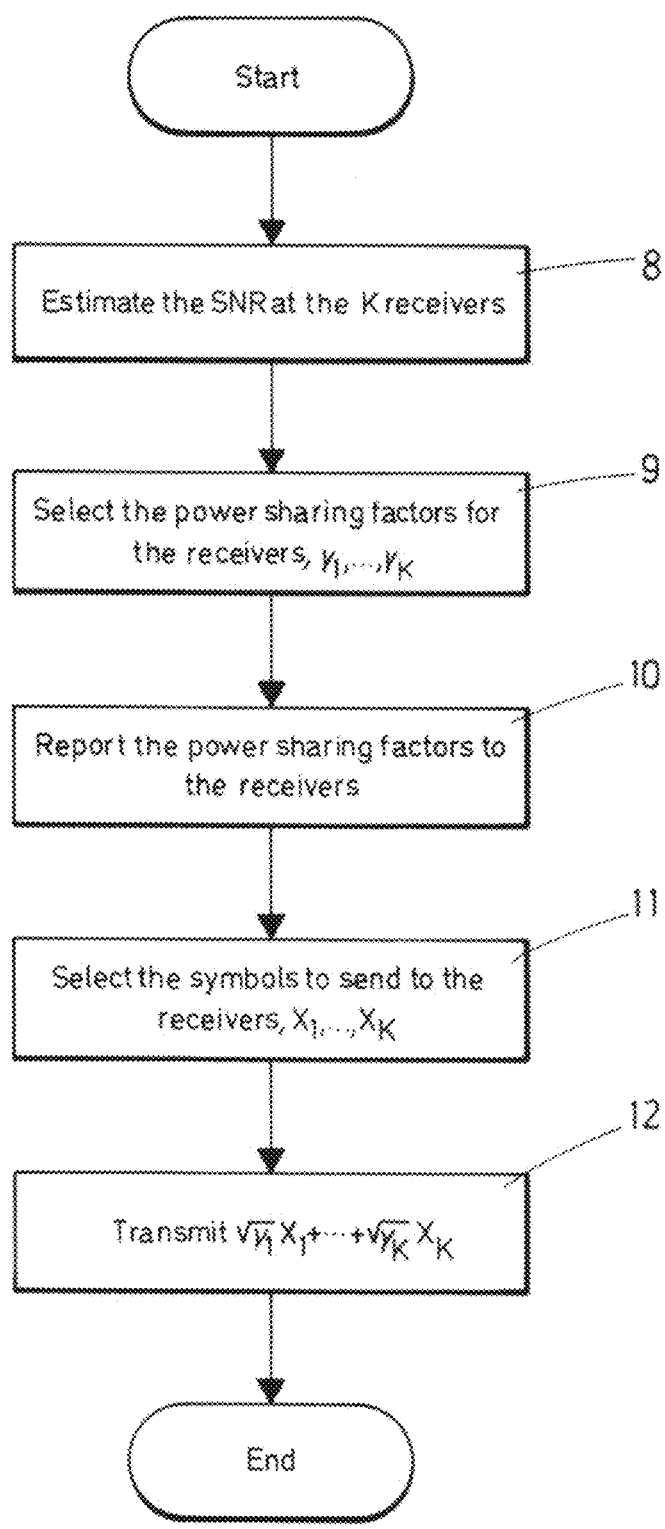
FIG. 3 shows a flowchart of the process performed by a transmitter according to the present invention.

FIG. 3 shows a flowchart of the process performed by a transmitter. In a first transmitting step (8) there is an estimation of the SNR at each of the receivers. As mentioned above, this estimation can be performed directly at the transmitter or it can be estimated on each receiver and sent to the transmitter by means of a control channel.

In a second transmitting step (9) the transmitter selects the power sharing factor for each of the receivers. This power sharing factor is represented as "y" and the sub-index corresponds to the receiver. This second transmitting step (9) is performed for each of the k receivers. It should be noted that the power sharing factor cannot exceed 1 since it represents the ratio of power that will be used for each receiver.

In a third transmitting step (10) the power factor is sent to each of the receivers. This can be done, for example, through a control channel.

In a fourth transmitting step (11) the transmitter selects a symbol for each of the receivers. This symbol comprises the information to be sent to each user. Also, this symbol is represented by the letter "X" and the sub-indexes correspond to each receiver.

Finally, in a fifth transmitting step (12) the information signal (2) comprising the power sharing factor and the symbol is transmitted to the receivers. In particular this signal can be combined as follows:

$$\sqrt{\gamma_1}x_1 + \sqrt{\gamma_2}x_2 + \ldots + \sqrt{\gamma_k}x_k$$

being y is the power sharing factor, x is the symbol and the sub-indexes 1, 2, . . . k correspond to the receivers.

Figure 4:
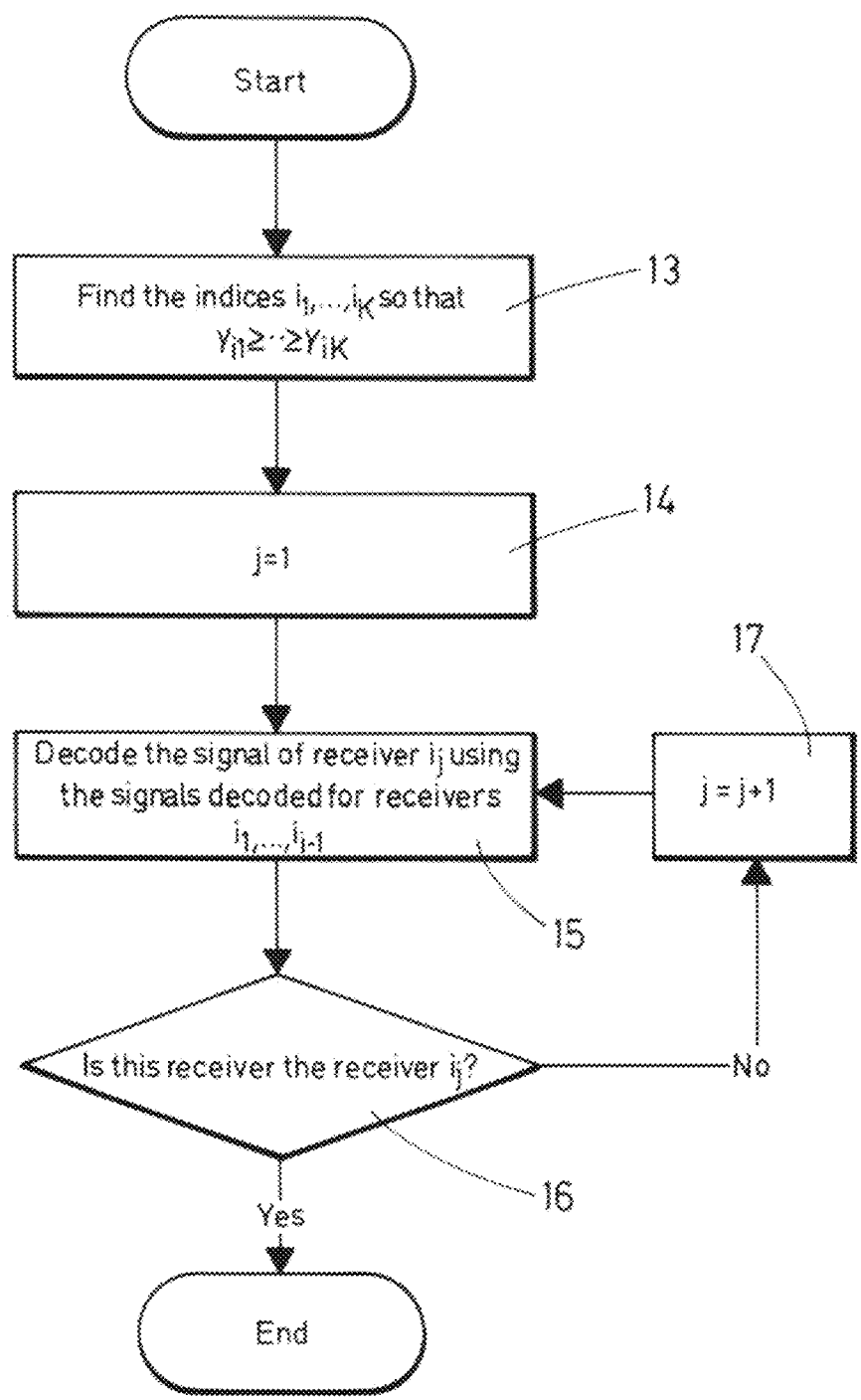
FIG. 4 shows a flowchart of the process performed by a receiver according to the present invention.

FIG. 4 shows a flow diagram for the decoding of the signal obtained by the process of FIG. 3.

In a first reception step (13) there is an ordering process in order to organize the power sharing factors of all of the receivers. After that, in a second reception step (14) the receiver starts by decoding the signal for the biggest power sharing factor. For that, the receiver sets an auxiliary variable j to one.

The first receiver (the receiver with the highest power sharing factor) proceeds to decode the symbol corresponding to such receiver and, the other receivers perform an iterative process wherein in a third reception step (15) the receiver decodes, using the previously decoded signal (in a third reception step (15) for previous receivers) the signals for all of the receivers previous to the current receiver. After that, by a decision operator (16) the receiver determines whether the currently decoded signal corresponds to the current receiver, if so, the process ends and, if it is not the current receiver, by a fourth reception step (17) the receiver increments the variable j in one unit and returns to the third reception step (15) until the current receiver is reached.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for non-coherent multi-user MIMO data transmission, the method comprising the acts of:
   a) estimating a signal-to-noise ratio for each of a plurality of receivers;
   b) selecting a power sharing factor for each of the plurality of receivers;
   c) encoding information to be sent to each of the plurality of receivers into a symbol for each of the plurality of receivers; and
   d) transmitting, by a transmitter, a signal that comprises, at least, the power sharing factors and the symbols for all of the receivers;
   wherein the signal transmitted in act d) is a sum of an arithmetical operation between the symbol and the power sharing factor of all of the receivers; and
   wherein the signal transmitted in act d) is:

$$\sqrt{\gamma_1}x_1 + \sqrt{\gamma_2}x_2 + \ldots + \sqrt{\gamma_k}x_k$$

wherein y is the power sharing factor, x is the symbol and the sub-indexes 1, 2, ... k correspond to the receivers.

2. The method for non-coherent multi-user MIMO data transmission according to claim 1, wherein the estimation of the signal-to-noise ratio is done at each of the receivers and communicated to the transmitter through a control channel.

3. The method for non-coherent multi-user MIMO data transmission according to claim 2, wherein the estimation is done by using a previous signal.

4. The method for non-coherent multi-user MIMO data transmission according to claim 3, wherein the previous signal is emitted by the transmitter.

5. The method for non-coherent multi-user MIMO data transmission according to claim 4, wherein the previous signal is a signal corresponding to a previous communication.

6. The method for non-coherent multi-user MIMO data transmission according to claim 4, wherein the previous signal is an acknowledgment signal.

7. The method for non-coherent multi-user MIMO data transmission according to claim 1, wherein the estimation of the signal-to-noise ratio is done at the transmitter.

8. The method for non-coherent multi-user MIMO data transmission according to claim 7, wherein the estimation is done by using a previous signal.

9. The method for non-coherent multi-user MIMO data transmission according to claim 8, wherein the previous signal is a signal corresponding to a previous communication.

10. The method for non-coherent multi-user MIMO data transmission according to claim 9, wherein the previous signal is emitted by one of the plurality of receivers.

11. The method for non-coherent multi-user MIMO data transmission, according to claim 9, wherein the previous signal is an acknowledgment signal.

12. The method for non-coherent multi-user MIMO data transmission according to claim 1, wherein
before performing act d), an act e) is performed wherein the transmitter sends each its corresponding power sharing factor.

13. A method for non-coherent multi-user MIMO data reception, the method comprising the acts of:
i) receiving, from a transmitter, a power sharing factor for all of a plurality of receivers;
ii) decoding the signal corresponding to the highest power sharing factor;
iii) determining if the signal decoded in act ii) corresponds to a current receiver;
iv) if the decoded signal corresponds to the current receiver, finalize the reception;
v) if the decoded signal does not correspond to the current receiver, proceed with the next power sharing factor and repeat acts iii) to iv).

14. The method for non-coherent multi-user MIMO data reception according to claim 13, wherein, in act ii), the signal is decoded using a maximum likelihood method.

15. The method for non-coherent multi-user MIMO data reception according to claim 13, wherein, in act i), a consecutive index is determined for each wherein the smallest index corresponds to the highest power sharing factor.

16. The method for non-coherent multi-user MIMO data reception according to claim 15, wherein, in act v), the next power sharing factor corresponds to the next index.

17. A system for non-coherent multi-user MIMO communication, comprising:
a transmitter operatively configured to execute processing to:
estimate a signal-to-noise ratio for each of a plurality of receivers;
select a power sharing factor for each of the plurality of receivers;
encode information to be sent to each of the plurality of receivers into a symbol for each of the plurality of receivers; and
transmit, by a transmitter, a signal that comprises, at least, the power sharing factors and the symbols for all of the receivers;
a receiver operatively configured to execute processing to:
receive, from a transmitter, a power sharing factor for all of the receivers;
decode the signal corresponding to the highest power sharing factor;
determine if the signal decoded in act ii) corresponds to a current receiver;
if the decoded signal corresponds to the current receiver, finalize the reception;
if the decoded signal does not correspond to the current receiver, proceed with the next power sharing factor and repeat the determining and finalizing processing.

* * * * *